US012183869B2

(12) United States Patent
Eo et al.

(10) Patent No.: US 12,183,869 B2
(45) Date of Patent: Dec. 31, 2024

(54) SECONDARY BATTERY

(71) Applicant: Samsung SDI Co., Ltd., Yongin-si (KR)

(72) Inventors: Soo Mi Eo, Yongin-si (KR); Seung Hee Park, Yongin-si (KR); Jea Woan Lee, Yongin-si (KR); Jae Min Lim, Yongin-si (KR); Euy Sun Jung, Yongin-si (KR); Kyung Hoon Cho, Yongin-si (KR); Young Kwang Cho, Yongin-si (KR); Kyeong Yi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 58 days.

(21) Appl. No.: 16/341,405

(22) PCT Filed: Oct. 17, 2017

(86) PCT No.: PCT/KR2017/011454
§ 371 (c)(1),
(2) Date: Apr. 11, 2019

(87) PCT Pub. No.: WO2018/080080
PCT Pub. Date: May 3, 2018

(65) Prior Publication Data
US 2020/0044225 A1    Feb. 6, 2020

(30) Foreign Application Priority Data
Oct. 27, 2016    (KR) .................... 10-2016-0141042

(51) Int. Cl.
*H01M 10/04*    (2006.01)
*H01M 10/0587*    (2010.01)
(Continued)

(52) U.S. Cl.
CPC ... *H01M 10/0431* (2013.01); *H01M 10/0587* (2013.01); *H01M 50/538* (2021.01);
(Continued)

(58) Field of Classification Search
CPC ... H01M 2/20–263; H01M 50/50–538; H01M 10/04–0431; H01M 10/05–0587;
(Continued)

(56) References Cited

U.S. PATENT DOCUMENTS

| 7,501,201 B2 | 3/2009 | Ishikawa et al. |
| 8,298,702 B2 | 10/2012 | Morimoto et al. |

(Continued)

FOREIGN PATENT DOCUMENTS

| CN | 1753238 A | 3/2006 |
| CN | 1783568 A | 6/2006 |

(Continued)

OTHER PUBLICATIONS

Extended European Search Report for corresponding European Patent Application No. 17866044.5, dated May 19, 2020, 10 pages.

(Continued)

*Primary Examiner* — Jonathan G Jelsma
*Assistant Examiner* — Niara Trant
(74) *Attorney, Agent, or Firm* — Lewis Roca Rothgerber Christie LLP

(57) ABSTRACT

Various embodiments of the present invention relate to a secondary battery, and the objective of the present invention is to provide a secondary battery, which has drop-impact resistance, by providing an electrode assembly having a relatively thick inner circumferential and a relatively thin outer circumferential tab. To this end, disclosed is a secondary battery, which comprises an electrode assembly comprising: an anode plate having an inner circumferential tab formed at a wound front end thereof; a separator covering (Continued)

the anode plate; and a cathode plate having an outer circumferential tab formed at a wound distal end thereof.

8 Claims, 7 Drawing Sheets

(51) Int. Cl.
| | |
|---|---|
| H01M 50/119 | (2021.01) |
| H01M 50/121 | (2021.01) |
| H01M 50/129 | (2021.01) |
| H01M 50/538 | (2021.01) |
| H01M 50/55 | (2021.01) |
| H01M 50/553 | (2021.01) |
| H01M 50/557 | (2021.01) |
| H01M 50/593 | (2021.01) |

(52) U.S. Cl.
CPC ....... *H01M 50/553* (2021.01); *H01M 50/557* (2021.01); *H01M 50/119* (2021.01); *H01M 50/121* (2021.01); *H01M 50/129* (2021.01); *H01M 50/55* (2021.01); *H01M 50/593* (2021.01)

(58) Field of Classification Search
CPC ............. H01M 50/557; H01M 50/121; H01M 50/119; H01M 50/55; H01M 50/593; H01M 50/129
See application file for complete search history.

(56) References Cited

U.S. PATENT DOCUMENTS

| | | | |
|---|---|---|---|
| 8,450,002 B2 | 5/2013 | Kwak | |
| 8,663,831 B2 | 3/2014 | Son et al. | |
| 10,340,497 B2* | 7/2019 | Zhu | H01M 2/263 |
| 2005/0123824 A1 | 6/2005 | Ishikawa et al. | |
| 2005/0277018 A1* | 12/2005 | Kim | H01M 10/617 |
| | | | 429/120 |
| 2006/0008701 A1* | 1/2006 | Kim | H01M 50/536 |
| | | | 429/174 |
| 2006/0222937 A1 | 10/2006 | Morimoto et al. | |
| 2008/0233474 A1 | 9/2008 | Son et al. | |
| 2008/0299450 A1* | 12/2008 | Lim | H01M 10/052 |
| | | | 429/231.95 |
| 2009/0092889 A1 | 4/2009 | Hwang et al. | |
| 2011/0027636 A1* | 2/2011 | Lee | H01M 2/1673 |
| | | | 429/94 |
| 2011/0183170 A1* | 7/2011 | Kwak | H01M 10/0431 |
| | | | 429/94 |
| 2012/0094161 A1 | 4/2012 | Zheng | |
| 2012/0196165 A1* | 8/2012 | Kim | H01M 50/119 |
| | | | 429/94 |
| 2015/0295270 A1* | 10/2015 | Chun | H01M 10/0422 |
| | | | 429/94 |
| 2016/0268581 A1* | 9/2016 | Ahn | H01M 6/10 |
| 2017/0170437 A1* | 6/2017 | Lee | H01M 50/119 |
| 2017/0207438 A1 | 7/2017 | Zhu et al. | |
| 2019/0198851 A1* | 6/2019 | Woo | H01M 10/0431 |

FOREIGN PATENT DOCUMENTS

| | | |
|---|---|---|
| CN | 1988240 A | 6/2007 |
| CN | 101694815 A | 4/2010 |
| CN | 101877413 A | 11/2010 |
| CN | 102136563 A | 7/2011 |
| CN | 203150628 U | 8/2013 |
| CN | 204696190 U | 10/2015 |
| CN | 105355992 A | 2/2016 |
| CN | 205376656 U | 7/2016 |
| CN | 205376669 U | 7/2016 |
| CN | 105826509 A | 8/2016 |
| KR | 10-2004-0058921 A | 7/2004 |
| KR | 10-2004-0065788 A | 7/2004 |
| KR | 10-2004-0088500 A | 10/2004 |
| KR | 10-2005-0118579 A | 12/2005 |
| KR | 10-2006-0105417 A | 10/2006 |
| KR | 10-2008-0085316 A | 9/2008 |
| KR | 10-0876268 | 12/2008 |
| KR | 10-0876270 B1 | 12/2008 |
| KR | 10-2011-0087559 A | 8/2011 |
| KR | 10-1156331 B1 | 6/2012 |
| KR | 10-2015-0000159 A | 1/2015 |

OTHER PUBLICATIONS

International Search Report for corresponding International Application No. PCT/KR2017/011454, dated Jan. 25, 2018, 3pp.

Chinese First Office action dated Aug. 24, 2021 issued in corresponding CN Application No. 201780065187.5, 11 pages, with English translation, 12 pages.

Chinese Decision of Rejection dated Jul. 25, 2022 issued in corresponding CN Application No. 201780065187.5, 5 pages, with translation, 9 pages.

Korean Office Action dated Aug. 30, 2023 issued in corresponding Korean Patent Application No. 10-2016-0141042 (5 pages).

Korean Notice of Allowance dated Jan. 30, 2024 issued in corresponding Korean Patent Application No. 10-2016-0141042 (7 pages).

\* cited by examiner

SECONDARY BATTERY

CROSS-REFERENCE TO RELATED APPLICATION(S)

This application is a National Phase Patent Application of International Patent Application Number PCT/KR2017/011454, filed on Oct. 17, 2017, which claims priority of Korean Patent Application No. 10-2016-0141042, filed Oct. 27, 2016. The entire contents of both of which are incorporated herein by reference.

TECHNICAL FIELD

Various embodiments of the present invention relate to a secondary battery.

BACKGROUND ART

In general, a primary battery is not rechargeable, but a secondary battery can be charged and discharged. Low-capacity secondary batteries are used in portable small-sized electronic devices, e.g., a smart phone, a feature phone, a notebook computer, a digital camera, a camcorder and the like, and high-capacity secondary batteries are extensively used as an energy source, e.g., for driving a motor for a hybrid car, an electric vehicle, a power storage cell, and the like.

The secondary battery includes an electrode assembly having a cathode and an anode, a case accommodating the electrode assembly, and electrode terminals connected to the electrode assembly. The case can be classified into, e.g., a cylindrical type, a prismatic type, a pouch type, and so on, according to the external shape of the case. Specifically, the pouch type secondary battery can be easily transformed in various shapes and can be formed of a pouch case having a small weight.

The above information disclosed in this Background section is only for enhancement of understanding of the background of the described technology and therefore it may contain information that does not form the prior art that is already known in this country to a person of ordinary skill in the art.

Technical Problems to be Solved

Various embodiments of the present invention provide a secondary battery.

Various embodiments of the present invention also provide an electrode assembly having a relatively thick inner circumferential tab and a relatively thin outer circumferential tab, thereby providing a secondary battery, which has drop-impact resistance.

In addition, various embodiments of the present invention provides a secondary battery, which has improved safety by rapidly emitting electrical energy due to an electrical short caused between the cathode distal end non-coating portion and the anode distal end non-coating portion (substrate-substrate short) without additional anode distal end non-coating portion during a drop impact/collision test, by providing an electrode assembly having an anode active material layer half-coating portion formed at a wound front end of an anode and a cathode active material layer half-coating portion formed at a wound distal end of a cathode, and which has an increased capacity by increasing an area of active material layer coating portions.

Technical Solutions

In accordance with an aspect of the present invention, the above and other objects can be accomplished by providing a secondary battery including an electrode assembly including an anode plate having an inner circumferential tab formed at a wound front end thereof, a separator covering the anode plate, and a cathode plate having an outer circumferential tab formed at a wound distal end thereof, and a pouch case accommodating the electrode assembly therein and having the inner circumferential tab and the outer circumferential tab outwardly extending therefrom.

The outer circumferential tab may include a first outer circumferential tab connected to the cathode plate, and a second outer circumferential tab outwardly extending from the pouch case while being connected to the first outer circumferential tab.

A thickness of the second outer circumferential tab may be greater than that of the first outer circumferential tab.

The anode plate may include an anode collector plate having an anode first surface and an anode second surface opposite to the anode first surface, an anode first active material layer coated on the anode first surface, and an anode second active material layer coated on the anode second surface, wherein an anode first non-coating portion without the anode first active material layer coated thereon is formed at a wound front end of the anode first surface, and the inner circumferential tab is welded to the anode first non-coating portion.

An anode second non-coating portion without the anode first active material layer coated thereon may be formed at a wound distal end of the anode first surface.

An anode third non-coating portion without the anode second active material layer coated thereon may be formed at a wound front end of the anode second surface.

The cathode plate may include a cathode collector plate having a cathode first surface and a cathode second surface opposite to the cathode first surface, a cathode first active material layer coated on the cathode first surface, and a cathode second active material layer coated on the cathode first surface, wherein a cathode first non-coating portion without the cathode first active material layer coated thereon is formed at a wound distal end of the cathode first surface, and the outer circumferential tab is welded to the cathode first non-coating portion.

A cathode second non-coating portion without the cathode first active material layer coated thereon may be formed at a wound front end of the cathode first surface.

A cathode third non-coating portion without the cathode second active material layer coated thereon may be formed at a wound distal end of the cathode second surface.

The anode plate may include an anode collector plate having an anode first surface and an anode second surface opposite to the anode first surface, an anode first active material layer coated on the anode first surface, and an anode second active material layer coated on the anode second surface, an anode first non-coating portion without the anode first active material layer coated thereon may be formed at a wound front end of the anode first surface, the inner circumferential tab may be welded to the anode first non-coating portion, an anode third non-coating portion without the anode second active material layer coated thereon may be formed at a wound front end of the anode second surface, the cathode plate may include a cathode collector plate having a cathode first surface and a cathode second surface opposite to the cathode first surface, a cathode first active material layer coated on the cathode first surface, and a cathode second active material layer coated on the cathode first surface, a cathode second non-coating portion without the cathode first active material layer coated thereon may be formed at a wound front end of the cathode first surface, and the anode first non-coating portion and the anode third non-coating portion of the wound front end may be inserted between portions of the bent cathode second non-coating portion of the wound front end.

The anode second non-coating portion without the anode first active material layer coated thereon may be formed at the wound distal end of the anode first surface, the cathode first non-coating portion without the cathode first active material layer coated thereon may be formed at the wound distal end of the cathode first surface, the outer circumferential tab is welded to the cathode first non-coating portion, the cathode third non-coating portion without the cathode second active material layer coated thereon may be formed at the wound distal end of the cathode second surface, and the anode second non-coating portion may be positioned at an exterior side of a region defined by the cathode third non-coating portion and the cathode first non-coating portion.

Advantageous Effects

Various embodiments of the present invention provide an electrode assembly having an inner circumferential tab and an outer circumferential tab, thereby providing a secondary battery, which has improved safety without a voltage drop during a drop impact/collision test.

In addition, various embodiments of the present invention provides an electrode assembly having an anode active material layer half-coating portion formed at a wound front end of an anode and a cathode active material layer half-coating portion formed at a wound distal end of a cathode, and which has an increased capacity by increasing an area of active material layer coating portions, thereby providing a secondary battery, which has improved safety by rapidly emitting electrical energy due to an electrical short between the cathode distal end non-coating portion and the anode distal end non-coating portion without additional anode distal end non-coating portion at an event of drop impact/collision.

BEST MODE FOR CARRYING OUT THE INVENTION

Figure 1A:
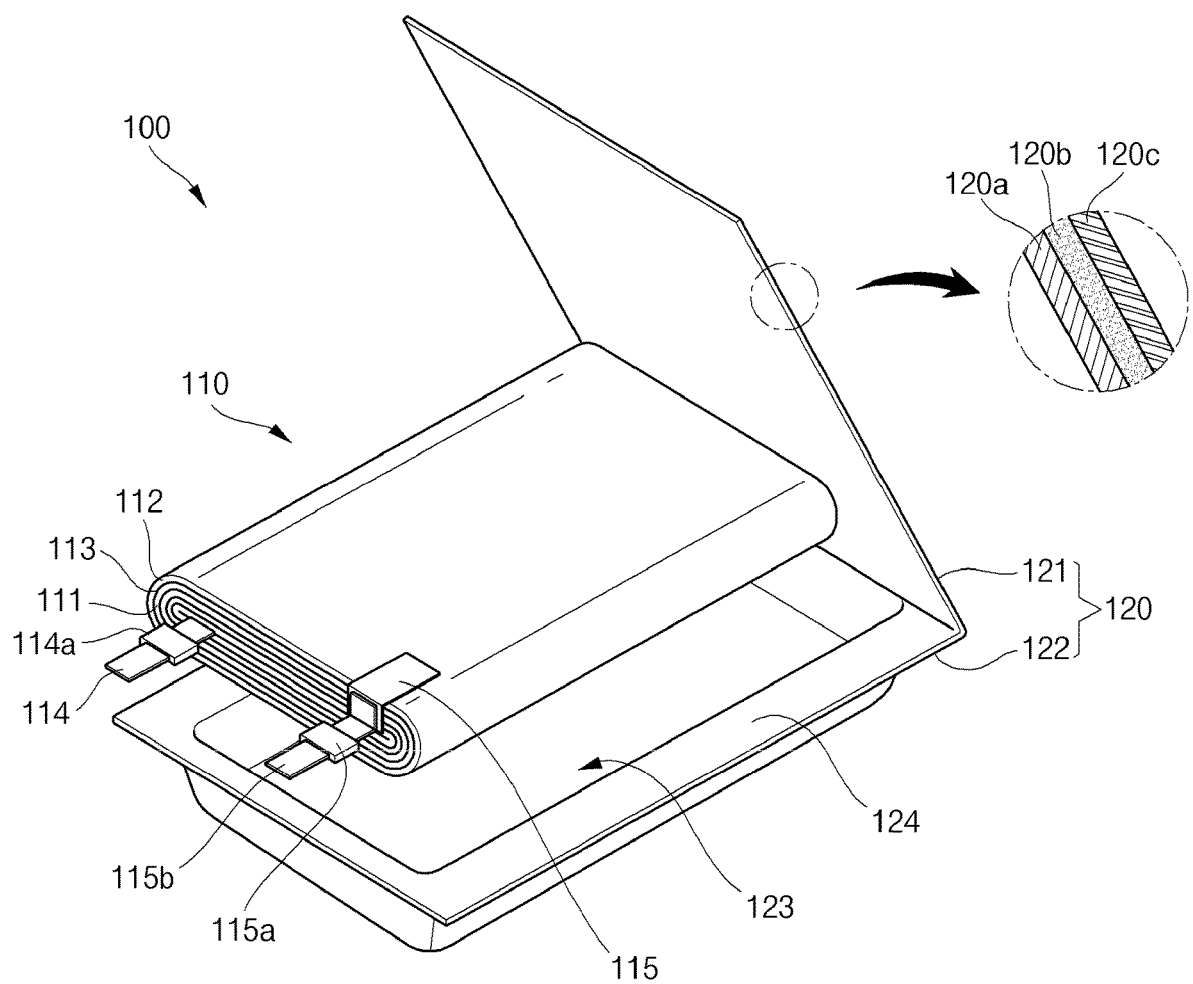
FIGS. 1A to 1C are an exploded perspective view, a plan view and a partly perspective view of a secondary battery according to various embodiments of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

In addition, as used herein, the term "separator" includes a separator generally used in liquid electrolyte batteries using a liquid electrolyte having a low affinity to the separator. Further, as used herein, the term "separator" may include an intrinsic solid polymer electrolyte in which the electrolyte is strongly bound to the separator to then be recognized as being the same as the separator, and/or a gel solid polymer. Therefore, the meaning of the separator should be defined as specifically defined in the specification of the present disclosure.

In addition, as used herein, the term "outer circumferential tab" is a concept including, for example, but not limited to, a first outer circumferential tab and a second outer circumferential tab. The first and second outer circumferential tabs may also be simply referred to as outer circumferential tabs.

Figure 1B:
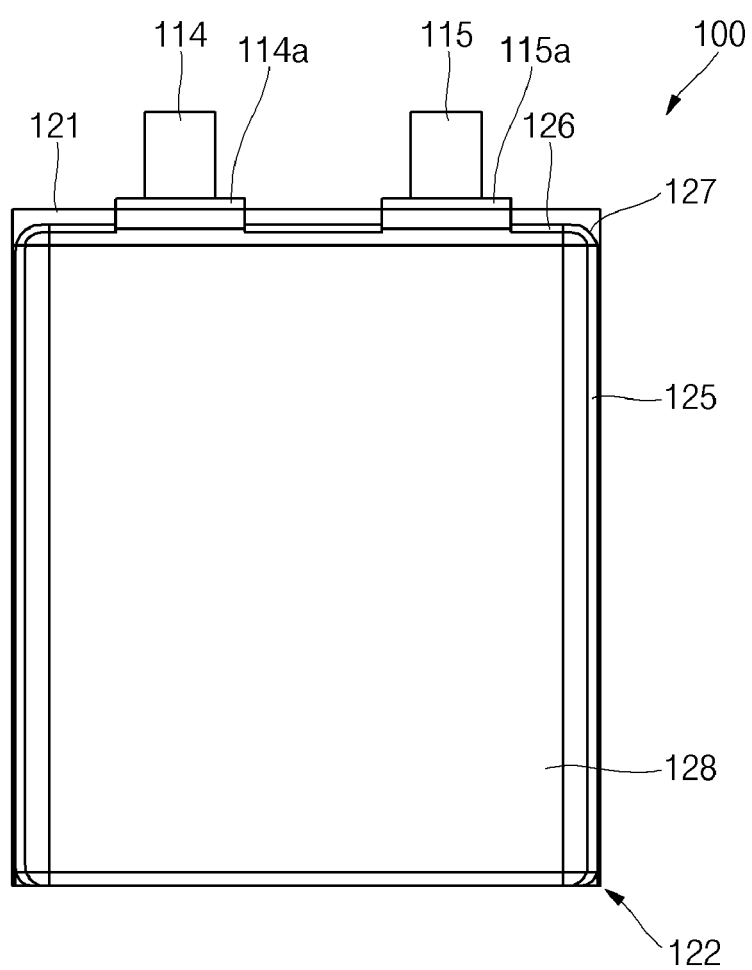
Figure 1C:
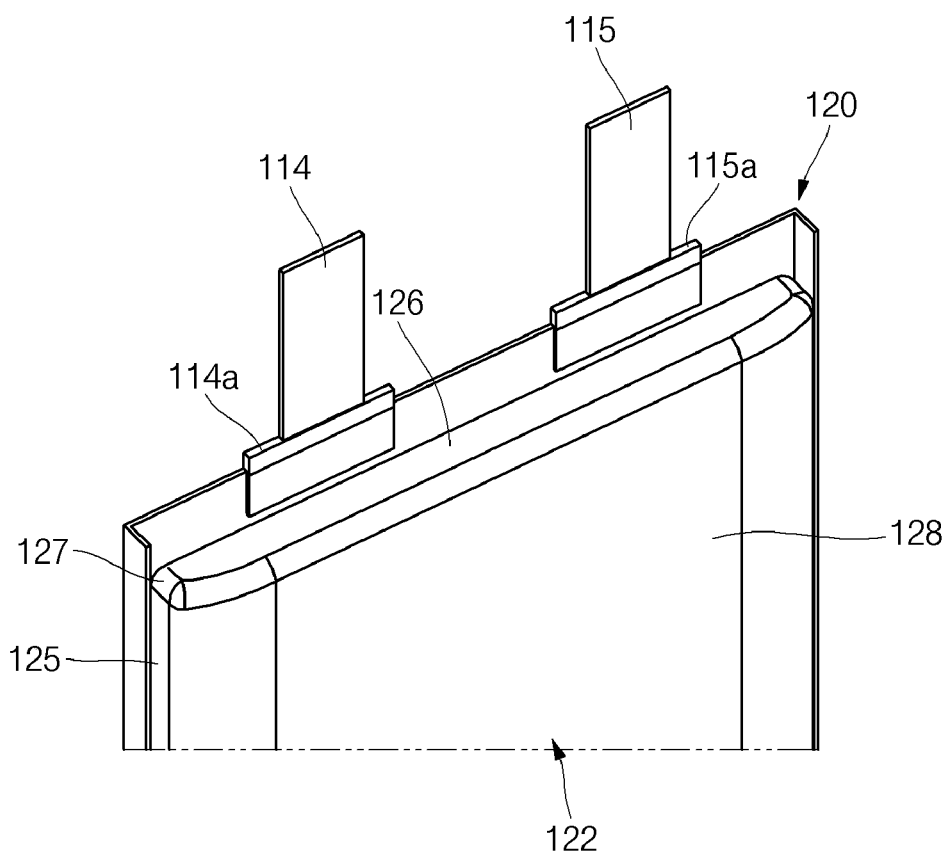

Referring to FIGS. 1A to 1C, an exploded perspective view, a plan view and a partly perspective view of a secondary battery according to various embodiments of the present invention are illustrated.

As illustrated in FIGS. 1A to 1C, the secondary battery 100 according to various embodiments of the present invention includes an electrode assembly 110 and a pouch case 120.

The electrode assembly 110 may include an anode plate 111, a cathode plate 112, and a separator 113 interposed between the anode plate 111 and the cathode plate 112. The electrode assembly 110 may be formed by winding a stack of the anode plate 111, the separator 113 and the cathode plate 112 in a jelly-roll configuration.

The anode plate 111 may include, for example, but not limited to, an anode active material layer coated on both surfaces of an anode collector plate formed of a conductive metal thin plate made of, for example, a copper or nickel foil or mesh. Here, the anode active material layer may include, for example, but not limited to, a carbon based material, Si, Sn, tin oxide, a tin alloy complex, a transition metal oxide, a lithium metal nitride or metal oxide. For example, a substantially planar inner circumferential tab 114, but not limited thereto, may be fixed (e.g., welded) to an anode non-coating portion of the anode collector plate, where the anode active material layer is not formed. That is to say, one end of the inner circumferential tab 114 may be electrically connected to the anode non-coating portion and the other end thereof may outwardly protrude and extend. In addition, an insulation member 114a may be attached to the inner circumferential tab 114, thereby preventing the inner circumferential tab 114 from being shorted to the pouch case 120.

The cathode plate 112 may include, for example, but not limited to, a cathode active material layer coated on both surfaces of a cathode collector plate formed of a highly conductive metal thin plate made of, for example, an aluminum foil or mesh. Here, the cathode active material layer may include, for example, but not limited to, a chalcogenide compound. As an example, a complex metal oxide, such as LiCoO2, LiMn2O4, LiNiO2, or LiNiMnO2, may be used in the cathode active material layer. For example, a first outer circumferential tab 115, which is thinner and wider than the inner circumferential tab 114, but not limited thereto, may be fixed (e.g., welded) to a cathode non-coating portion of the cathode collector plate, where the cathode active material layer is not formed. In addition, a relatively thick second outer circumferential tab 115b may be welded to the relatively thin first outer circumferential tab 115. That is to say, one end of the second outer circumferential tab 115b may be electrically connected to the first outer circumferential tab 115 and the other end thereof may outwardly protrude and extend. In addition, an insulation member 115a may be attached to the second outer circumferential tab 115b, thereby preventing the second outer circumferential tab 115b from being shorted to the pouch case 120. Here, the inner circumferential tab 114 may have a thickness equal or similar to that of the second outer circumferential tab 115b. In addition, a welded region of the first outer circumferential tab 115 and the second outer circumferential tab 115b may be bent at a substantially right angle, thereby allowing the inner circumferential tab 114 and the second outer circumferential tab 115b to establish the same plane or similar planes.

The separator 113 is interposed between the anode plate 111 and the cathode plate 112 to prevent an electrical short from occurring between the anode plate 111 and the cathode plate 112. In practice, the separator 113 is provided in a pair, and the anode plate 111 is held between a pair of separators 113. In addition, the separator 113 may be made of, for example, but not limited to, one selected from the group consisting of polyethylene, polypropylene and a porous copolymer of polyethylene, polypropylene. In order to prevent an electrical short from occurring between the anode plate 111 and the cathode plate 112, the separator 113 may have a larger width than the anode plate 111 and the cathode plate 112. In addition, the term "separator" is a concept, which encompasses, but not limited to, a solid electrolyte (e.g., an inorganic ceramic based electrolyte, such as perovskite-, NASICON-, LISICON-, sulfide-, garnet- or glass-based electrolyte, or a polymer-based electrolyte). In this case, a liquid electrolyte may be omitted.

The pouch case 120 accommodates the electrode assembly 110 and is formed by sealing outer circumferential edges of the electrode assembly 110. The pouch case 120 includes a first case part 121, and a second case part 122 having one end connected to the first case part 121 and including a recess 123 having a predetermined depth to accommodate the electrode assembly 110.

In addition, edges of the first and second case parts 121 and 122, corresponding to the outer circumferential edges of the electrode assembly 110, are thermally fused to each other, thereby allowing the electrode assembly 110 to be accommodated in the case 120 of a substantially pouch or pocket type.

That is to say, the pouch case 120 is formed by bending an integrally formed pouch case shaped of a rectangular plate at a lengthwise central portion of its one side, thereby providing a first case part 121 and a second case part 122. The recess 123 having a predetermined length is formed in the second case part 122 through a pressing or drawing process to accommodate the electrode assembly 110, and a sealing part 124 is formed on the outer circumferential edge of the recess 123 to seal the second case part 122 with the first case part 121. The sealing part 124 may be formed at one side where the first case part 121 and the second case part 122 are brought into contact with each other to be integrated and at three other sides.

In addition, the second case part 122 includes four extending regions extending away from the first case part 121 and a planar region connected to the four extending regions and serving as a bottom of the recess 123. Of course, a recess having a predetermined length, corresponding to the recess 123, may also be formed in the second case part 122. Among the four extending regions, relatively long regions may be defined as long-side extending regions, and relatively short regions may be defined as short-side extending regions.

The inner circumferential tab 114 and the second outer circumferential tab 115b of the electrode assembly 110 may be outwardly drawn through the welded region of the first case part 121 and the second case part 122. Here, the insulation members 114a and 115b respectively formed in the inner circumferential tab 114 and the second outer circumferential tab 115b are sealed together with the sealing part 124. That is to say, the insulation members 114a and 115b are formed on contact portions between each of the inner circumferential tab 114 and the second outer circumferential tab 115b and the sealing part 124, thereby preventing the inner circumferential tab 114 and the second outer circumferential tab 115b from being electrically shorted to the pouch case 120.

The pouch case 120 may be formed to have a multilayered structure including, for example, but not limited to, a first insulation layer 120a, a metal layer 120b and a second insulation layer 120c. Additionally, various adhesion layers or functional layers may further be formed, but detailed descriptions thereof will not be given so as not to obscure the essence of the present disclosure.

The first insulation layer 120a defining an inner surface of the pouch case 120 may be formed using a material having an insulating property and thermal adhesiveness. In addition, the first insulation layer 120a is formed on one surface of the metal layer 120b and defines the inner surface of the pouch case 120 facing the electrode assembly 110. The first insulation layer 120a may be formed using, but not limited to, casted polypropylene (CPP) that does not react with an electrolyte, and an equivalent thereof. The electrode assembly 110 is received in the recess 123 of the second case part 122 and the recess 123 is covered by the first case part 121, so that the first insulation layers 120a of the first and second case parts 121 and 122 of the pouch case 120 are brought into contact with each other. Therefore, the sealing part 124 is thermally fused to allow the first insulation layers 120a to be adhered to each other, thereby sealing the pouch case 120.

The metal layer 120b is interposed between the first insulation layer 120a and the second insulation layer 120c to prevent external moisture and oxygen from penetrating into the pouch case 120. If the pouch case 120 is filled with an electrolyte solution, the metal layer 120 may prevents the internal electrolyte solution from flowing out. In addition, the metal layer 120b may also function to maintain a mechanical strength of the pouch case 120. The metal layer 120b may be generally made of, but not limited to, aluminum, an aluminum alloy, iron, or an iron alloy.

The second insulation layer 120c defining an outer surface of the pouch case 120 may function to relieve mechanical, chemical impacts between the pouch case 120 and an external electronic device. In addition, the second insulation layer 120c is formed on the other surface of the metal layer 120b to define the outer surface of the pouch case 120. The second insulation layer 120c may be formed using, but not limited to, nylon, polyethylene terephthalate (PET), polybutylene terephthalate (PBT), polybutylene naphthalate (PBN), and an equivalent thereof.

Meanwhile, in the pouch case 120 of the secondary battery 100 according to various embodiments of the present invention, the second case part 122 may include a plurality of extending regions 125, 126 and 127 extending away from the first case part 121, and a planar region 128 connected to the four extending regions 125, 126 and 127 and substantially parallel with the first case part 121.

Here, the plurality of extending regions 125, 126 and 127 and the one planar region 128 may substantially define the recess 123 accommodating the electrode assembly 110. In addition, two of the extending regions 125, 126 and 127 may be defined as long-side extending regions 125, which are relatively long, the other two of the extending regions 125, 126 and 127 may be defined as short-side extending regions 126, and corners between the long-side extending regions 125 and the short-side extending regions 126 may be defined as corner extending regions 127.

Figure 2A:
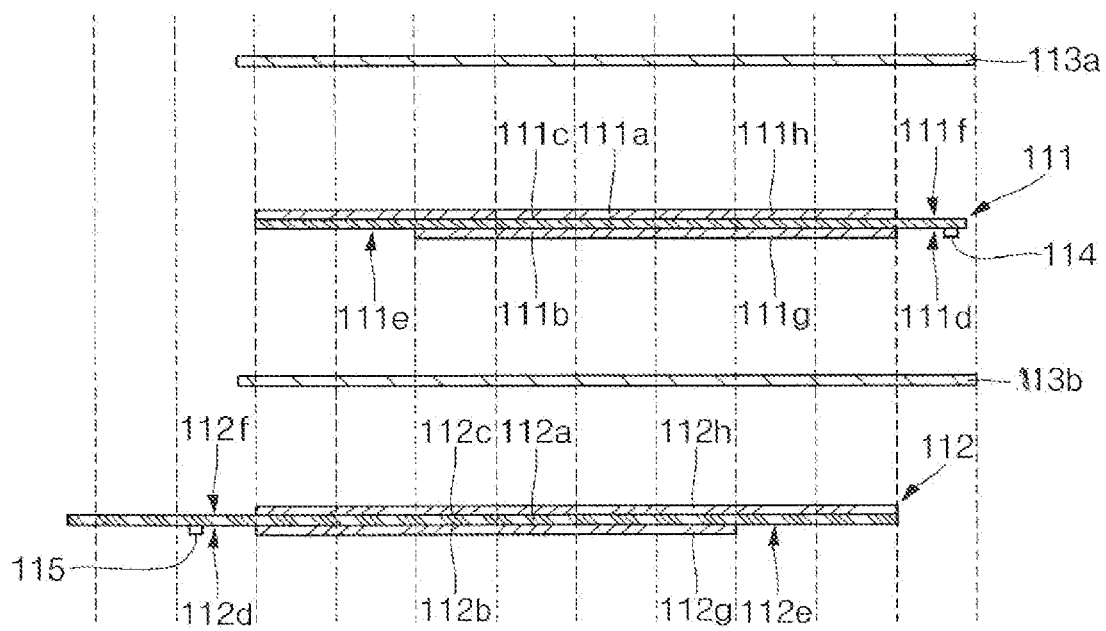
FIGS. 2A and 2B illustrate states before an electrode assembly is wound in a secondary battery according to various embodiments of the present invention.
Figure 2B:
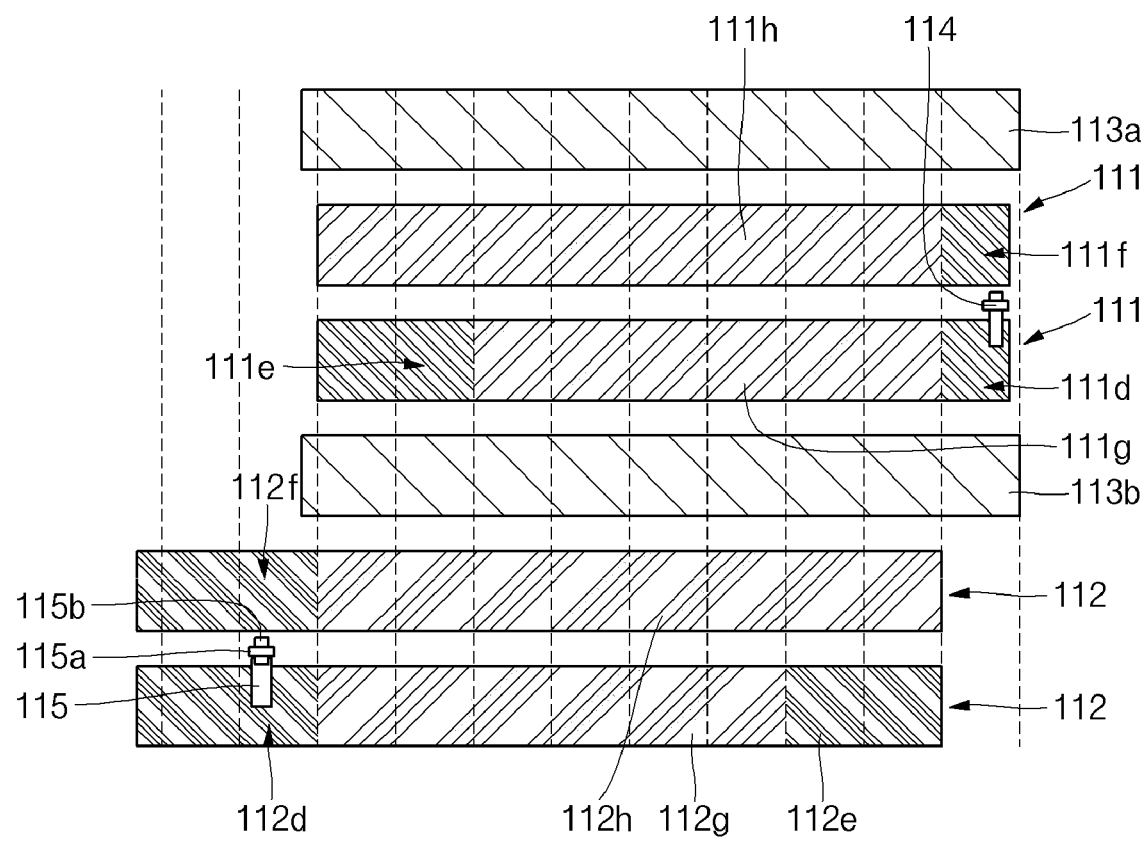

Referring to FIGS. 2A and 2B, states before an electrode assembly 110 is wound in the secondary battery 100 according to various embodiments of the present invention are illustrated. In FIGS. 2A and 2B, a multitude of vertical dotted lines indicate bent regions, wound regions or winding turn numbers of the electrode assembly 110 during a winding process of the electrode assembly 110.

As illustrated in FIGS. 2A and 2B, in the secondary battery 100 according to various embodiments of the present invention, the electrode assembly 110 includes the anode plate 111 having the inner circumferential tab 114 formed at a wound front end thereof, a pair of separators 113a and 113b covering the anode plate 111, and the cathode plate 112 having the first outer circumferential tab 115 formed at a wound distal end thereof. In practice, the second outer circumferential tab 115b may further be connected to the first outer circumferential tab 115.

Here, the wound front end means a region where winding starts, and the wound distal end means a region where winding ends, during the winding process of the electrode assembly 110. Therefore, the inner circumferential tab 114 of the wound front end is positioned substantially at an inner circumference (or internal center) of the wound electrode assembly 110, and the first outer circumferential tab 115 of the wound distal end is positioned substantially at an outer circumference (or external surface) of the wound electrode assembly 110.

As described above, in the electrode assembly 110 of the secondary battery 100 according to the embodiment of the present invention, the inner circumferential tab 114 of the wound front end and the first outer circumferential tab 115 of the wound distal end become spaced away from each other. That is to say, the inner circumferential tab 114 and the first outer circumferential tab 115 are disposed to have the largest distance between each other horizontally and/or vertically.

Therefore, during a drop impact/collision test of the secondary battery 100, the secondary battery 100 is designed to have a large distance between the inner circumferential tab 114 and the first outer circumferential tab 115, so that a slight current leakage is not generated between the inner circumferential tab 114 and the first outer circumferential tab 115, an instantaneous voltage drop does not occur to the secondary battery 100. Accordingly, the secondary battery 100 according to the embodiment of the present invention can achieve output safety during a drop impact/collision test.

Meanwhile, a thickness of the inner circumferential tab 114 may be greater than that of the first outer circumferential tab 115. For example, the thickness of the inner circumferential tab 114 may be in the range from approximately 50 μm to approximately 150 μm, and the thickness of the first outer circumferential tab 115 may be in the range from approximately 20 μm to approximately 40 μm, but aspects of the present disclosure are not limited thereto. Here, the relatively narrow inner circumferential tab 114 may be referred to as, for example, a general strip terminal, and the relatively wide outer circumferential tab 115 may be referred to as, for example, a substrate tab. Of course, the second outer circumferential tab 115b connected to the first outer circumferential tab 115 may have a thickness and a width, equal or similar to those of the inner circumferential tab 114.

In addition, the inner circumferential tab 114 may be made of, for example, but not limited to, copper, a copper alloy, nickel, a nickel alloy, nickel/copper/nickel clad metals, or nickel plated copper. In addition, the first and second outer circumferential tabs 115 and 115b may be made of, for example, but not limited to, aluminum or an aluminum alloy.

As described above, since the thickness of the inner circumferential tab 114 is greater than that of the first outer circumferential tab 115, a coupling strength between the electrode assembly 110 and the pouch case 120 may be increased, thereby preventing the electrode assembly 110 from moving within the pouch case 120 during a drop impact test. Accordingly, the safety of the secondary battery 100 may be further improved. Of course, in order to improve the safety of the secondary battery 100, not only the inner circumferential tab 114 but the second outer circumferential tab 115 may be implemented as relatively thick strip terminals.

Next, the anode plate 111 and the cathode plate 112 of the electrode assembly 110 and an organic connection relationship will be described in more detail.

The anode plate 111 includes an anode collector plate 111a, an anode first active material layer 111g, an anode second active material layer 111h, and the inner circumferential tab 114. The anode collector plate 111a includes a substantially planar anode first surface 111b, and a substantially planar anode second surface 111c opposite to the anode first surface 111b. In addition, the anode first active material layer 111g is coated on the anode first surface 111b of the anode collector plate 111a, and the anode second active material layer 111h is coated on the anode second surface 111c of the anode collector plate 111a.

Here, an anode first non-coating portion 111d (a region corresponding to approximately one turn from one end), where the anode first active material layer 111g is not coated, is formed at a wound front end of the anode first surface 111b, and an anode second non-coating portion 111e (a region corresponding to approximately two turns from the other end), where the anode first active material layer 111g is not coated, is formed at a wound distal end of the anode first surface 111b, In addition, an anode third non-coating portion 111f (a region corresponding to approximately one turn from one end), where the anode second active material layer 111h is not coated, is formed at a wound front end of the anode second surface 111c. In addition, an anode non-coating portion is not formed at a wound distal end of the anode second surface 111c.

Here, the inner circumferential tab 114 may be fixed to the anode first non-coating portion 111d of the anode plate 111 by, for example, but not limited to, ultrasonic welding, laser welding or resistance welding.

Meanwhile, the pair of separators 113a and 113b may cover the anode first non-coating portion 111d, the anode second non-coating portion 111e, the anode third non-coating portion 111f, the anode first active material layer 111g and the anode second active material layer 111h of the anode plate 111, and the pair of separators 113a and 113b may have a length substantially the same with or larger than that of the anode plate 111.

The cathode plate 112 includes a cathode collector plate 112a, a cathode first active material layer 112g, a cathode second active material layer 112h, and the first outer circumferential tab 115. The cathode collector plate 112a includes a substantially planar cathode first surface 112b and a substantially planar cathode second surface 112c opposite to the cathode first surface 112b. In addition, the cathode first active material layer 112g is coated on the cathode first surface 112b of the cathode collector plate 112a, and the cathode second active material layer 112h is coated on the cathode second surface 112c of the cathode collector plate 112a.

Here, a cathode first non-coating portion 112d (a region corresponding to approximately two turns from one end), where the cathode first active material layer 112g is not coated, is formed at a wound distal end of the cathode first surface 112b, and a cathode second non-coating portion 112e (a region corresponding to approximately two turns from the other end), where the cathode first active material layer 112g is not coated, is formed at a wound front end of the cathode first surface 112b. In addition, a cathode third non-coating portion 112f (a region corresponding to approximately two turns from one end), where the cathode second active material layer 112h is not coated, is formed at a wound distal end of the cathode second surface 112c. In addition, a cathode non-coating portion is not formed at a wound front end of the cathode second surface 112c.

Here, the first outer circumferential tab 115 may be fixed to the cathode first non-coating portion 112d of the cathode plate 112 by, for example, but not limited to, ultrasonic welding, laser welding or resistance welding.

Figure 3:
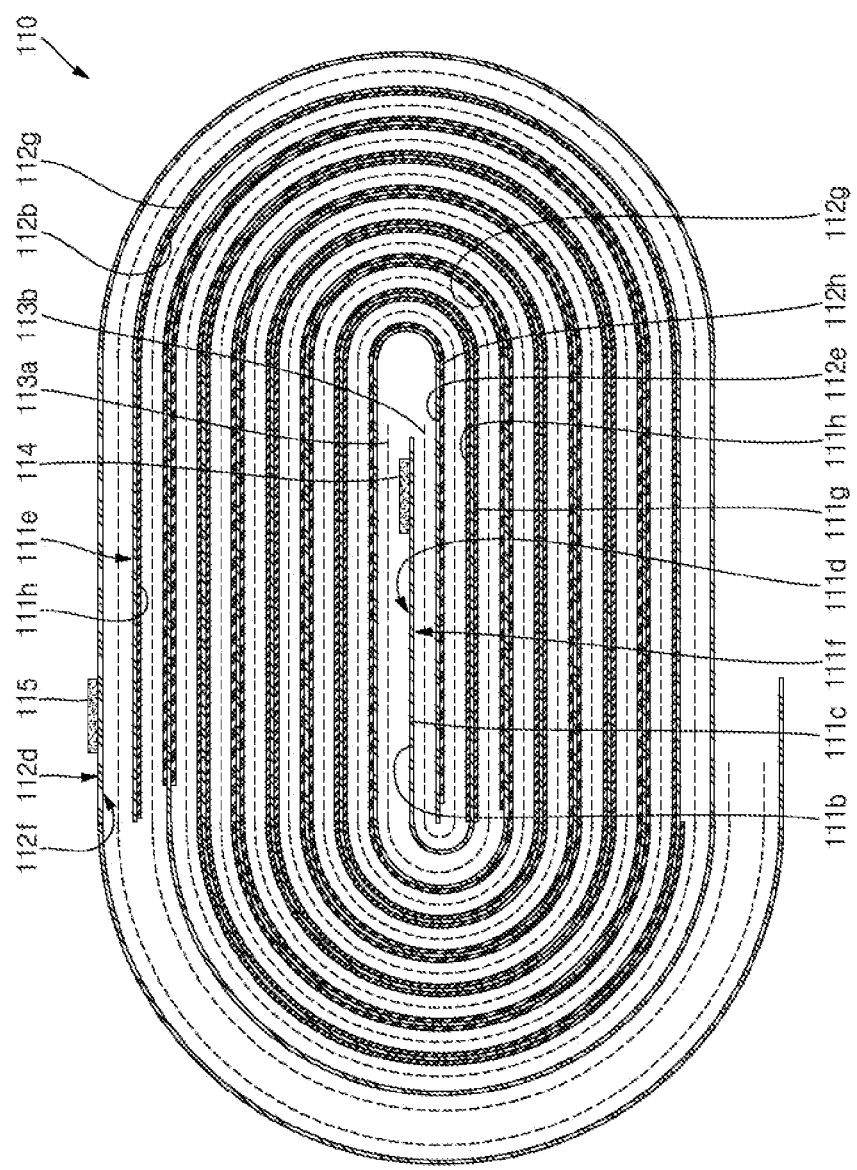
FIG. 3 illustrates a state after an electrode assembly is wound in the secondary battery according to various embodiments of the present invention.
Figure 4:
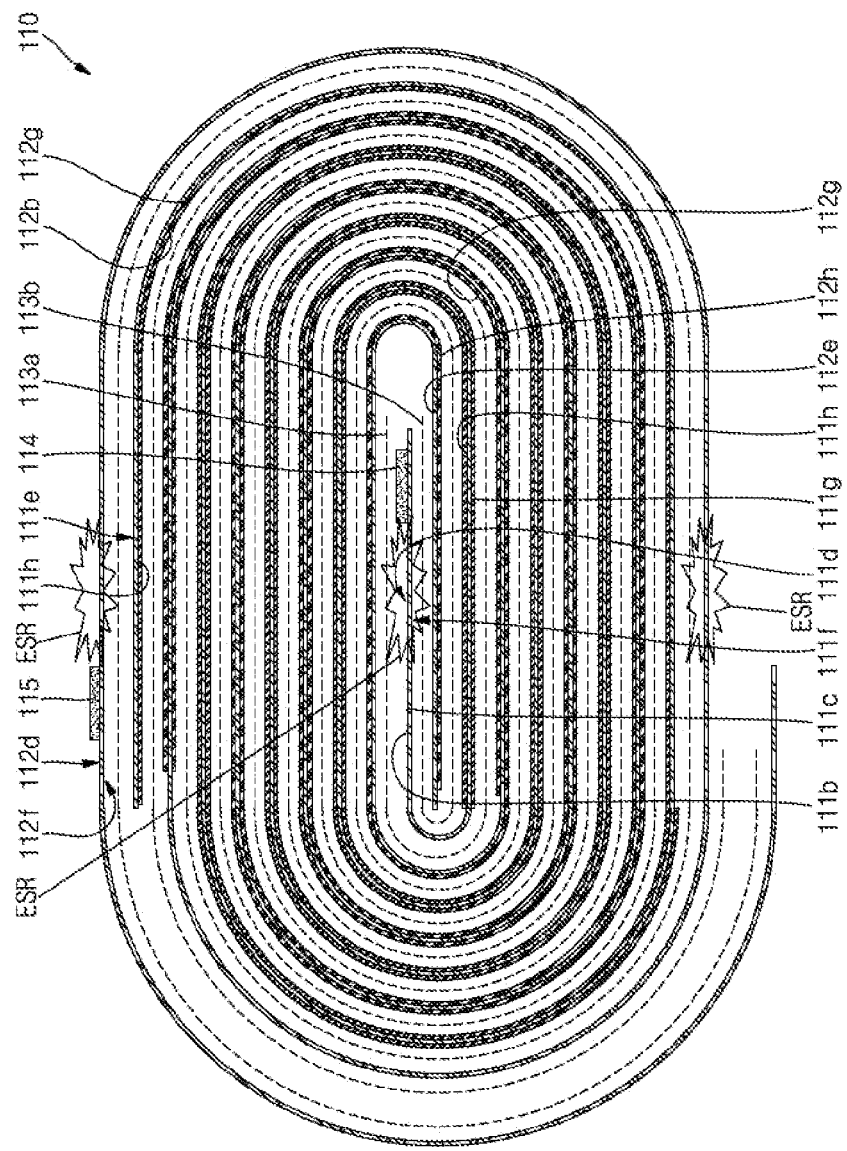
FIG. 4 illustrates an electrically shorted region of an electrode assembly in the secondary battery according to various embodiments of the present invention.

Referring to FIG. 3, a state after the electrode assembly 110 is wound in the secondary battery 100 according to various embodiments of the present invention is illustrated. Referring to FIG. 4, an electrically shorted region ESR of the electrode assembly 110 in the secondary battery 100 according to various embodiments of the present invention is illustrated. As used herein, the term "electrical short" means a state in which the anode non-coating portion and the cathode non-coating portion are directly electrically connected to each other as the separators 113a and 113b are torn during a penetration test or a drop impact/collision test.

As illustrated in FIG. 3, in the wound electrode assembly 110, the anode first non-coating portion 111d of the wound front end and the anode third non-coating portion 111f (that is, the anode non-coating portion of the wound front end) are configured to be inserted between portions of the bent cathode second non-coating portion 112e of the wound front end. That is to say, a region defined by the anode first non-coating portion 111d and the anode third non-coating portion 111f positioned at a first turn from the wound front end is inserted into the bent cathode second non-coating portion 112e positioned at first and second turns from the wound front end. In other words, the region of the anode first non-coating portion 111d and the anode third non-coating portion 111f positioned at the wound front end is inserted into regions of the cathode second non-coating portion 112e in a substantially counterclockwise inverted U-shaped configuration.

Of course, the separator 113a is interposed between the anode first non-coating portion 111d and the cathode second non-coating portion 112e (that is, an upper region of the anode first non-coating portion 111d), and the separator 113b is interposed between the anode third non-coating portion 111f and the cathode second non-coating portion 112e (that is, a lower region of the anode third non-coating portion 111f).

In addition, the inner circumferential tab 114 is welded to the anode first non-coating portion 111d to then be fixed. Therefore, the inner circumferential tab 114 faces the cathode second non-coating portion 112e (that is, an upper region of the inner circumferential tab 114).

In this way, as illustrated in FIG. 4, as the separators 113a and 113b are pierced or torn during a penetration test or a drop impact/collision test of the secondary battery 100, the anode first non-coating portion 111d and the cathode second non-coating portion 112e (that is, the upper region of the anode first non-coating portion 111d) may be electrically shorted, or the anode third non-coating portion 111f and the cathode second non-coating portion 112e (that is, the lower region of the anode third non-coating portion 111f) may be electrically shorted to each other, so that electrical energy can be rapidly emitted from the electrode assembly 110, thereby improving the safety of the secondary battery 100.

In addition, as illustrated in FIG. 3, in the wound electrode assembly 110, the anode second non-coating portion 111e of the wound distal end is positioned at an interior of the region defined by the cathode first non-coating portion 112d of the wound distal end and the cathode third non-coating portion 112f opposite thereto (that is, the cathode non-coating portion of the wound distal end). That is to say, the cathode third non-coating portion 112f positioned at the first and second turns from one end is configured to face the anode second non-coating portion 111e positioned at first and second turns from one end. In other words, the cathode third non-coating portion 112f positioned at the first and second turns from the wound distal end is formed in a substantially circular configuration, and the anode second non-coating portion 111e positioned at the first and second turns from the wound distal end is formed at an interior of the cathode third non-coating portion 112f in a substantially counterclockwise inverted U-shaped configuration.

Of course, the anode second non-coating portion 111e is covered by the separators 113a and 113b. In addition, the first outer circumferential tab 115 is welded to the cathode first non-coating portion 112d to then be fixed. Therefore, the first outer circumferential tab 115 may directly face the pouch case 120.

As described above, as illustrated in FIG. 4, as the separators 113a and 113b may be pierced or torn during a penetration test or a drop impact/collision test of the secondary battery 100, the cathode third non-coating portion 112f and the anode second non-coating portion 111e are electrically shorted, so that electrical energy can be rapidly emitted from the electrode assembly 110, thereby improving the safety of the secondary battery 100. These structures and operations can be equally applied along the entire outer periphery of the electrode assembly 110.

In general, during a penetration test or a drop impact/collision test of a secondary battery, when a cathode active material layer and an anode active material layer are directly electrically shorted, electrical resistance is greatest, so that the largest amount of heat is generated, making the secondary battery be in the most dangerous state. Then, the next most dangerous state of the secondary battery may be in a case where an active material and a non-coating portion are electrically shorted. However, during a penetration test or a drop impact/collision test of a secondary battery, when a cathode non-coating portion and an anode non-coating portion are directly electrically shorted, like in the embodiment of the present invention, electrical resistance is smallest, so that the smallest amount of heat is generated while electrical energy is emitted most rapidly, thereby making the secondary battery be in the least dangerous state.

Therefore, according to the embodiment of the present invention, as described above, during a penetration test or a drop impact/collision test of a secondary battery, a cathode non-coating portion and an anode non-coating portion are directly electrically shorted at least three points (see FIG. 4) to emit electrical energy, thereby further improving the safety of the secondary battery. In practice, electrical shorts may occur at a center of an electrode assembly and an arbitrary region of the entire outer periphery of the electrode assembly.

In addition, according to the embodiment of the present invention, a non-coating portion is not formed at the wound distal end of the anode second surface 111c of the anode plate 111, but the anode second active material layer 111h is coated on the anode second surface 111c. In addition, a non-coating portion is not formed at the wound front end of the cathode second surface 112c of the cathode plate 112, but the cathode second active material layer 112h is coated on the cathode second surface 112c. Accordingly, an area of the non-coating portion is relatively reduced while a coating area of the active material layer is increased, thereby increasing the capacity of the secondary battery 100. That is to say, the electrode assembly 110 according to the embodiment of the present invention is suitably employed to the high-capacity secondary battery 100.

In addition, according to the embodiment of the present invention, since the cathode second non-coating portion 112e is provided at the wound front end of the cathode first surface 112b of the cathode plate 112 (e.g., the region corresponding to first and second turns from one end) without coating the cathode first active material layer 112g, cracks or pinholes, which causes a serious problem to a high-density cathode active material layer, may not occur to the wound front end.

In addition, according to the embodiment of the present invention, since the anode active material layer is configured to be coated on both surfaces, that is, the anode first and second surfaces 111b and 111c, rather than a single surface, of the anode plate 111 from the region corresponding to the second turn of the wound front end, a curl may not occur at the wound front end of the anode plate 111, thereby solving a problem of a winding axis insertion failure during winding of the electrode assembly 110.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

| Brief explanation of essential parts of the drawings | |
|---|---|
| 100: | Secondary battery according to an embodiment of the present invention |
| 110: | Electrode assembly |
| 111: | Anode plate |
| 111a: | Anode collector plate |
| 111b: | Anode first surface |
| 111c: | Anode second surface |
| 111d: | Anode first non-coating portion |
| 111e: | Anode second non-coating portion |
| 111f: | Anode third non-coating portion |
| 111g: | Anode first active material layer |
| 111h: | Anode second active material layer |
| 112: | Cathode plate |
| 112a: | Cathode collector plate |
| 112b: | Cathode first surface |
| 112c: | Cathode second surface |
| 112d: | Cathode first non-coating portion |
| 112e: | Cathode second non-coating portion |
| 112f: | Cathode third non-coating portion |
| 112g: | Cathode first active material layer |
| 112h: | Cathode second active material layer |
| 113, 113a, 113b: | Separator |
| 114: | Inner circumferential tab |
| 115: | First outer circumferential tab |
| 120: | Pouch case |

The invention claimed is:

1. A secondary battery comprising:
an electrode assembly including an anode plate having an inner circumferential tab formed at a wound front end thereof, a separator covering the anode plate, and a cathode plate having an outer circumferential tab formed at a wound distal end thereof; and
a pouch case accommodating the electrode assembly therein and having the inner circumferential tab and the outer circumferential tab outwardly extending therefrom, wherein the anode plate includes an anode collector plate having an anode first surface and an anode second surface opposite to the anode first surface, an anode first active material layer coated on the anode first surface, and an anode second active material layer coated on the anode second surface, an anode first non-coating portion without the anode first active material layer coated thereon is formed at a wound front end of the anode first surface, the inner circumferential tab is welded to the anode first non-coating portion, an anode third non-coating portion without the anode second active material layer coated thereon is formed at a wound front end of the anode second surface, the cathode plate includes a cathode collector plate having a cathode first surface and a cathode second surface opposite to the cathode first surface, a cathode first active material layer coated on the cathode first surface, and a cathode second active material layer coated on the cathode second surface, a cathode second non-coating portion without the cathode first active material layer coated thereon is formed at a wound front end of the cathode first surface, and the anode first non-coating portion and the anode third non-coating portion at the wound front end of the anode plate are inserted between portions of the cathode second non-coating portion that face each other at the wound front end of the cathode first surface, the anode third non-coating portion extending along an entire length from the wound front end of the anode second surface to a first winding turn thereof.

2. The secondary battery of claim 1, wherein an anode second non-coating portion without the anode first active material layer coated thereon is formed at a wound distal end of the anode first surface, a cathode first non-coating portion without the cathode first active material layer coated thereon is formed at a wound distal end of the cathode first surface, the outer circumferential tab is welded to the cathode first non-coating portion, a cathode third non-coating portion without the cathode second active material layer coated thereon is formed at a wound distal end of the cathode second surface, and the anode second non-coating portion is positioned at an exterior-facing side at a region defined by the cathode third non-coating portion and the cathode first non-coating portion.

3. The secondary battery of claim 1, wherein a first length of the anode first non-coating portion extends from a first side of the anode plate to a second side of the anode plate that is opposite the first side along a direction parallel to a winding axis of the electrode assembly.

4. The secondary battery of claim 3, wherein a cathode first non-coating portion without the cathode first active material layer coated thereon is formed at a wound distal end of the cathode first surface, and a first length of the cathode first non-coating portion extends from a first side of the cathode plate to a second side of the cathode plate that is opposite the first side of the cathode plate along the direction parallel to the winding axis of the electrode assembly.

5. The secondary battery of claim 1, wherein a cathode first non-coating portion without the cathode first active material layer coated thereon is formed at a wound distal end of the cathode first surface, and a first length of the cathode first non-coating portion extends from a winding end of the cathode plate to at least two winding turns thereof.

6. The secondary battery of claim 1, wherein the outer circumferential tab includes a first outer circumferential tab connected to the cathode plate, and a second outer circumferential tab outwardly extending from the pouch case while being connected to the first outer circumferential tab.

7. The secondary battery of claim 6, wherein a thickness of the second outer circumferential tab is greater than that of the first outer circumferential tab.

8. The secondary battery of claim 1, wherein an anode second non-coating portion without the anode first active material layer coated thereon is formed at a wound distal end of the anode first surface, a cathode third non-coating portion without the cathode second active material layer coated thereon is formed at a wound distal end of the cathode second surface, a first surface of the separator is directly adjacent to the anode second non-coating portion along an entire first length of the anode second non-coating portion, the first length of the anode second non-coating portion extending from a winding end of the anode plate to at least one winding turn thereof, and a second surface of the separator opposite the first surface is directly adjacent to the cathode third non-coating portion along an entire first length of the cathode third non-coating portion, the first length of the cathode third non-coating portion extending from a winding end of the cathode plate to at least one winding turn thereof, the winding end of the anode plate and the winding end of the cathode plate being at a distal winding end of the electrode assembly, the first surface of the separator being directly adjacent to the anode second non-coating portion at a midplane of the electrode assembly that extends parallel to a winding axis of the electrode assembly, and the second surface of the separator being directly adjacent to the cathode third non-coating portion at the midplane.

* * * * *